March 1, 1955  E. WAINER  2,703,354

ALKALINE EARTH MANGANATE CERAMICS

Filed Feb. 23, 1950

Inventor
Eugene Wainer
By Morris A. Robkin
Attorney

United States Patent Office 2,703,354
Patented Mar. 1, 1955

2,703,354

ALKALINE EARTH MANGANATE CERAMICS

Eugene Wainer, Cleveland, Ohio, assignor, by mesne assignments, to Radio Corporation of America, a corporation of Delaware Application February 23, 1950, Serial No. 145,652

15 Claims. (Cl. 201—63)

This invention relates generally to improved ceramic semi-conductive materials and, more particularly, to improved ceramic materials of which the principal constituents are the manganates of the alkaline earth metals, barium, calcium, strontium, and magnesium. The present invention also relates to circuit elements made of these novel materials.

The alkaline earth metal manganate ceramics which are a part of the present invention have been found to have several unique properties making them particularly useful for various practical applications. They generally possess large negative temperature coefficients of resistance. They also exhibit nonlinearity of resistance with varying fields of current or voltage. Not only does their resistance vary with voltage, but the variation is different for A.-C. and D.-C. voltages. Their resistances also vary somewhat with the frequency of the applied current and several of the members have been found to be ferroelectric; that is, they exhibit a pronounced hysteresis in charge and discharge cycles. Some of the high resistance members are also piezoelectric and, in addition, have high dielectric constants. Finally, by controlled modification of compositions, resistivities of a few ohms to several thousand megohms are made available.

One object of the present invention is to provide novel materials having unique electrical properties.

Another object of the invention is to provide a novel group of ceramic materials.

Another object of the invention is to provide novel ceramic materials having non-linear electrical properties.

Another object of the invention is to provide improved electrical circuit elements composed of novel ceramic materials.

A further object of the invention is to provide novel methods of preparing the alkaline earth metal ceramic materials.

Figure 1:
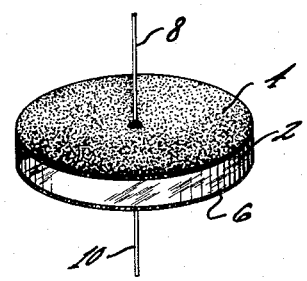
Figure 2:
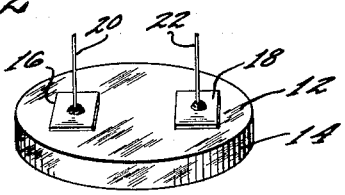

These and other objects will be more apparent and the invention will be more readily understood from the following description including the drawings of which:

Figure 1 is a perspective view of a device embodying the materials of the present invention, and Figure 2 is a perspective view of another embodiment of the device which is illustrated in Figure 1.

One aspect of the present invention relates to novel ceramic materials. These novel materials, in general, comprise ceramic semi-conductive materials consisting essentially of any one of the alkaline earth metal manganates, or a ceramic mixture of meta-manganate and ortho-manganate of any one of the alkaline earth metals, or mixtures of manganates of two or more alkaline earth metals, or alkaline earth metal manganates combined with a fluxing agent, or alkaline earth metal manganates modified by the addition of minor percentages of various oxides. A second aspect of the invention relates to novel methods of preparing these ceramic materials. A third aspect of the invention relates to circuit elements made of the novel materials disclosed herein.

The alkaline earth manganates, themselves, have been found to be extremely refractory, having vitrification temperatures of about 2800° to 3000° F. In order to reduce the firing temperature to a more easily obtainable range, it is advantageous to employ compatible fluxing agents.

In addition to the use of fluxes, relatively small quantities of certain oxides may be added to the manganates for the purpose of increasing or decreasing resistivity as may be required for different purposes.

The method of preparation will now be illustrated with an example which is typical of the method of preparing any of the materials of the present invention. The method of preparation to be described is, itself, a part of the invention. The example deals with the preparation of barium meta-manganate.

One mole of barium carbonate is thoroughly mixed with one mole of precipitated manganese dioxide. The mixture is then calcined at 2300° F. for three hours in a strongly oxidizing atmosphere, in this case, oxygen, after which the calcine is ground in a ball mill until all the particles will pass a 325 mesh screen. The various modifying agents and fluxes, if any are to be used, may then be mixed with the dry powder in the desired proportions, and the material is formed into a pellet in a ceramic press. In this operation, a temporary binder may be used to make the molding operation easier. Suitable temporary binders for molding ceramic mixtures are well known. Water solutions of polyvinyl alcohol or water dispersions of a wax are preferred.

The molded pellet is then fired in a furnace to the vitrification temperature of the mixture. This temperature will vary with the materials being fired and with the kind and amount of flux used but, in general, is between about 1900° F. and about 2800° F. In order for the product to have the highest values of resistance, it is necessary to fire the mixture in oxygen and, after the vitrification temperature has been reached, the body is allowed to soak at this temperature for about an hour, after which it is immediately removed and cooled in air to room temperature in a matter of minutes. Slow cooling produces a body having lower resistivity. Lowered resistivity also results if the body is subsequently reheated close to the vitrification temperature and then cooled slowly. Firing in a neutral atmosphere, such as nitrogen or argon, also tends to decrease resistivity sharply and, therefore, should not be resorted to if high values of resistivity are desired. The product of this process is a ceramic, semi-conductive material comprising the metallic meta-manganate and, for the example above given, $BaMnO_3$.

If it is desired to prepare the ortho-manganate instead of the meta-form, two moles of alkaline earth carbonate are used for each mole of manganese dioxide. If barium carbonate is used, the product is $Ba_2MnO_4$.

In general, the materials of the present invention are ceramic meta-manganates having the formula $XMnO_3$ and ceramic ortho-manganates having the formula $X_2MnO_4$ where X is any one of the alkaline earth metals.

Novel compositions may be prepared having improved electrical properties by mixing various proportions of separately prepared meta-manganate and ortho-manganate in order to get a material having a composition midway between the two. Alternately, the proper quantities of alkaline earth carbonate and manganese dioxide may be mixed and, in the calcining operation, may be converted directly to the intermediate manganate.

The mixed alkaline earth manganates, comprising combinations of two or more of the barium, calcium and strontium manganates may be made in the same fashion. For example, if it is desired to prepare a mixture of barium meta-manganate and strontium ortho-manganate, the two may be mixed as separate entities just before the vitrification step, or the final product may be prepared directly in the calcining operation by mixing the two metallic carbonates and manganese dioxide in the requisite proportions and heating to vitrification temperature. The materials may be mixed in any proportions since they are completely compatible.

In general, the barium manganates have been found to have the highest resistivities. The meta-manganates have been found generally better in electrical insulating properties than the ortho-manganates. Materials having desired values of resistivity and dielectric constant can thus be obtained by selecting the proper proportions of the different ingredients.

Various fluxes may be used although lead borate is generally preferred. Examples of other suitable fluxes are lead oxide, lead silicate, and boric acid. These other fluxes are sometimes desirable from the standpoint of imparting particular electrical properties to the compositions. In general, the purposes of adding a flux are (1) to enable the firing temperature to be reduced to a more readily available range and (2) to control the oxygen balance in the product. The valence of manganese in these manganates varies with the amount of available oxygen and the temperature of firing. Hence, by using a flux which enables a lower firing temperature to be used, the oxygen balance in the product may be varied. The oxygen balance, in turn, affects the electrical properties of the product.

In Table I below are given examples of mixtures of different proportions of lead borate flux with single members of the alkaline earth manganates. The firing temperature in each instance is the vitrification temperature, which, of course, varies with the amount of flux used as well as with the particular manganate being prepared. Various electrical properties are given for each composition. Also included in Table I are compositions comprising various proportions of the ortho- and meta-forms of the same alkaline earth metal manganate. It will be noted that A.-C. resistivity rises with increasing proportions of the ortho-manganate in the case of both barium and strontium compounds. In column 1 of the table, the proportion of base material is always given on the basis of 100 parts by weight. In the second column of the table, the amount of flux is given in number of parts by weight which are to be mixed with 100 parts by weight of the base material.

Included in Table II, below, are compositions comprising various proportions of mixed ortho- and meta-manganates of two different alkaline earth metals. The proportions of base material and flux are expressed in parts by weight on the same basis as in Table I.

TABLE II
*Properties of mixed manganates*

| No. | Base Material | Flux | Firing Temp., °F. | A. C. resistivity, Ohm-cm. | K at 1,000 cycles | Dissipation Factor | Non-linearity | Ferro electric |
|---|---|---|---|---|---|---|---|---|
| 1 | 80SrMnO$_3$ / 20Ba$_2$MnO$_4$ | 5.0PbBO$_3$ | 2,300 | 1.5×10$^5$ | 7,000 | 1.03 | yes | high. |
| 2 | 20SrMnO$_3$ / 80Ba$_2$MnO$_4$ | 5.0PbBO$_3$ | 2,600 | 1.2×10$^7$ | 240 | 0.51 | yes | high. |
| 3 | 20BaMnO$_3$ / 80Sr$_2$MnO$_4$ | 5.0PbBO$_3$ | 2,600 | 3.0×10$^{10}$ | 33 | 0.14 | linear | |
| 4 | 60BaMnO$_3$ / 40Sr$_2$MnO$_4$ | 5.0PbBO$_3$ | 2,600 | 1.8×10$^7$ | 130 | 0.79 | linear | |

In Table III, below, are listed a number of fired compositions all having relatively low values of resistivity. Some of these are single meta-manganates and various fluxes, some are mixtures of different alkaline earth metal meta-manganates and still others are single meta-manganates with titanium dioxide or manganese incorporated as modifying agents. As will be noted from the figures given in the table and by comparison with the figures given in Table I, the addition of titanium dioxide or manganese dioxide results in a product having modified A. C. resistivity although the modification is not always proportional to the amount of addition agent used. It has also been found, as shown by data included in Table III, that products of low resistivity can be formed by firing either strontium or calcium meta-manganate with a carbonate of one of the other alkaline earth metals.

TABLE I
*Properties of meta- and ortho-manganates*

| No. | Base Material | Flux | Firing Temp., °F. | A. C. resistivity, Ohm-cm. | K at 1,000 cycles | Dissipation Factor at 1,000 cycles | Non-linearity | Ferro electric |
|---|---|---|---|---|---|---|---|---|
| 1 | CaMnO$_3$ | 2.0PbBO$_3$ | 2,480 | 3.0×10$^5$ | 2×10$^4$ | >1.0 | yes | low. |
| 2 | CaMnO$_3$ | 10.0PbBO$_3$ | 2,220 | 2.5×10$^2$ | 2×10$^3$ | >1.0 | yes | low. |
| 3 | SrMnO$_3$ | 2PbBO$_3$ | 2,600 | 6.0×10$^3$ | | | yes | low. |
| 4 | SrMnO$_3$ | 10.0PbBO$_3$ | 2,100 | 3.0×10$^3$ | | | yes | low. |
| 5 | BaMnO$_3$ | 2.0PbBO$_3$ | 2,600 | 3.0×10$^7$ | 2,900 | 0.32 | yes | high. |
| 6 | BaMnO$_3$ | 10.0PbBO$_3$ | 1,900 | 3.0×10$^4$ | 240,000 | >1.0 | yes | low. |
| 7 | 80BaMnO$_3$ / 20Ba$_2$MnO$_4$ | 1.0PbBO$_3$ | 2,550 | 1.2×10$^6$ | 2,700 | 0.54 | yes | high. |
| 8 | 65BaMnO$_3$ / 35Ba$_2$MnO$_4$ | 1.0PbBO$_3$ | 2,700 | 3.0×10$^8$ | 75 | 0.54 | yes | low. |
| 9 | 50BaMnO$_3$ / 50Ba$_2$MnO$_4$ | 2.5PbBO$_3$ | 2,600 | 2.0×10$^{10}$ | 42 | 0.21 | yes | low. |
| 10 | 80SrMnO$_3$ / 20Sr$_2$MnO$_4$ | 20.0PbBO$_3$ | 1,800 | 1.5×10$^6$ | 2,640 | 1.4 | yes | low. |
| 11 | 65SrMnO$_3$ / 35Sr$_2$MnO$_4$ | 20.0PbBO$_3$ | 1,900 | 4.0×10$^8$ | 90 | 0.26 | yes | ? |
| 12 | 50SrMnO$_3$ / 50Sr$_2$MnO$_4$ | 20.0PbBO$_3$ | 1,900 | 3.0×10$^{10}$ | 50 | 0.21 | yes | ? |
| 13 | Sr$_2$MnO$_4$ | 5.0PbBO$_3$ | 2,600 | 1.0×10$^{12}$ | 35 | 0.09 | yes | high. |
| 14 | Sr$_2$MnO$_4$ | 7.5PbBO$_3$ | 2,600 | 1.0×10$^{12}$ | 30 | 0.04 | yes | high. |
| 15 | Sr$_2$MnO$_4$ | 10.0PbBO$_3$ | 2,600 | 1.0×10$^{12}$ | 30 | 0.05 | yes | high. |
| 16 | Ba$_2$MnO$_4$ | | 2,200 | 3.0×10$^{10}$ | 45 | 0.02 | no | |

The proportions of the materials used in each composition listed in Table III are on the same weight basis as described in connection with Table I.

TABLE III

*Low resistance manganates*

| No. | Composition | Firing Temperature, °F. | A. C. Resistivity, Ohm/cm. |
|---|---|---|---|
| 1 | $SrMnO_3+10PbO$ | 2,600 | 9.0 |
| 2 | $SrMnO_3+10PbSiO_3$ | 2,600 | 600.0 |
| 3 | $SrMnO_3+10H_3BO_3$ | 2,100 | 31.0 |
| 4 | $90SrMnO_3$ / $10CaMnO_3$ | 2,600 | 45.0 |
| 5 | $80SrMnO_3$ / $20CaMnO_3$ | 2,700 | 66.0 |
| 6 | $70SrMnO_3$ / $30CaMnO_3$ | 2,700 | 160.0 |
| 7 | $65.9CaMnO_3$ / $34.1SrCO_3$ | 2,700 | 75.0 |
| 8 | $74.1CaMnO_3$ / $25.9MgCO_3$ | 2,500 | 30.0 |
| 9 | $79.2SrMnO_3$ / $20.8CaCO_3$ | 2,700 | 105.0 |
| 10 | $100CaMnO_3+1TiO_2$ | 2,500 | 360.0 |
| 11 | $100CaMnO_3+5TiO_2$ | 2,500 | 180.0 |
| 12 | $100CaMnO_3+10TiO_2$ | 2,500 | 243.0 |
| 13 | $100SrMnO_3+1TiO_2$ | 2,600 | 3.0 |
| 14 | $100SrMnO_3+5TiO_2$ | 2,600 | 10.0 |
| 15 | $100SrMnO_3+10TiO_2$ | 2,600 | 69.0 |
| 16 | $100SrMnO_3+1MnO_2$ | 2,600 | 10.6 |
| 17 | $100SrMnO_3+5MnO_2$ | 2,600 | 5.4 |
| 18 | $100SrMnO_3+10MnO_2$ | 2,600 | 3.0 |
| 19 | $100BaMnO_3+10MnO_2$ | 2,400 | 2.7 |

The A. C. resistivity of the ceramic alkaline earth metal manganates of the present invention can be increased by adding minor proportions of metallic oxides from the class consisting of cadmium, magnesium, and zinc. Table IV, below, contains examples of compositions comprising 100 parts by weight of barium meta-maganate and 10 parts by weight of lead borate flux together with varying proportions of cadmium oxide, magnesium oxide, or zinc oxide.

TABLE IV

*Use of modifiers imparting increased A. C. resistivity*

| Composition | Modifiers | Firing Temperature, °F. | A. C. Resistivity |
|---|---|---|---|
| $100BaMnO_3+10PbBO_3$ | | 1,900 | $3.0 \times 10^4$ |
| $100BaMnO_3+10PbBO_3$ | 1CdO | 1,900 | $3.8 \times 10^6$ |
| $100BaMnO_3+10PbBO_3$ | 3CdO | 1,900 | $4.5 \times 10^6$ |
| $100BaMnO_3+10PbBO_3$ | 1MgO | 1,900 | $4.6 \times 10^4$ |
| $100BaMnO_3+10PbBO_3$ | 3MgO | 1,900 | $2.5 \times 10^6$ |
| $100BaMnO_3+10PbBO_3$ | 1ZnO | 1,900 | $1.5 \times 10^5$ |
| $100BaMnO_3+10PbBO_3$ | 3ZnO | 1,900 | $6.0 \times 10^6$ |

In general, useful products can be obtained by incorporating from about 1% to about 20% by weight of the various modifying agents, listed in the above tables, with the ceramic manganates.

Any of the materials which have been described above may be made up in the form of shaped bodies which may be provided with electrodes so that they can be used as circuit elements. Referring to the drawings, Figure 1, a ceramic disc 2 composed of any of the materials of the present invention may have its two major surfaces coated with silver paste and this paste may then be fired as is well known in this art so that the disc is provided with electrodes 4 and 6 integrally united to the ceramic. Lead wires 8 and 10 may be soldered, one to each of the silver electrodes.

Instead of providing each major face of the disc with electrodes, other arrangements may be made. For example, as shown in Figure 2, one face 12 of a ceramic disc 14 may be provided with two fired-on electrodes 16 and 18, separated on the face of the disc. Lead wires 20 and 22 may then be soldered to these electrodes such that one wire is connected to each electrode.

Various other arrangements of electrodes and lead wires may also obviously be made where other forms are necessary.

The circuit elements which have been described have many practical applications. In general, they are useful in many types of regulating and protective systems. One method of utilizing their regulative properties is to incorporate them in a circuit and apply heat to them. Since their resistance changes with temperature, they can be made to pass varying amounts of current by varying the temperature.

Another means by which these non-linear circuit elements may make available control characteristics is in circuits in which varying potentials may be applied. When relatively low currents are first applied to a resistor of this type, the voltage will initially have a relationship to the applied current somewhat similar to an ohmic relationship. Then, as the current is increased, the amount of voltage suddenly becomes much greater than that expected from Ohm's law. As the current continues to increase, the voltage decreases rather sharply and, in this portion of the curve, the element exhibits a strongly negative resistance characteristic. At some limiting current, the voltage drop in the resistance element becomes comparable to that of the metal lead wires.

These non-linear elements may also be used in time delay devices. If the element is placed in series with a source of voltage, the initial current is small due to high resistance of the element when cold. However, the element heats up in use and the final current is limited only by the circuit resistance. Thus, by this means, time delays of from a few milliseconds to several seconds may be obtained.

Other suggested uses of these circuit elements are compensating devices in circuitry for changes in resistance due to ambient temperature changes in circuits having positive temperature coefficients of resistance, as resistance thermometers usable at very high temperatures, and as sensitive current and power measuring devices.

As power responsive variable resistance devices, these non-linear elements may be used in measuring small amounts of power in automatic transmission regulating networks, for long line communication circuits, in signal and characteristic shaping networks, such as speech volume limiters, compressors, or expanders.

I claim:

1. A ceramic semi-conductive material consisting essentially of the fired vitrified product of at least one manganate selected from the group consisting of $BaMnO_3$, $Ba_2MnO_4$, $CaMnO_3$, $Ca_2MnO_4$, $MgMnO_3$, $Mg_2MnO_4$, $SrMnO_3$ and $Sr_2MnO_4$, and 1–10% by weight of a flux selected from the class consisting of lead borate, lead oxide, lead silicate and boric acid, to reduce the firing temperature of said material.

2. A ceramic semi-conductive material consisting essentially of the fired vitrified product of at least one manganate selected from the class consisting of $BaMnO_3$, $Ba_2MnO_4$, $CaMnO_3$, $Ca_2MnO_4$, $MgMnO_3$, $Mg_2MnO_4$, $SrMnO_3$ and $Sr_2MnO_4$, and between 1 and 20% by weight of an additional metal oxide selected from the class consisting of zinc oxide, magnesium oxide and cadmium oxide, to increase the A. C. resistivity of said material.

3. A ceramic semi-conductive material consisting essentially of the fired vitrified product of at least one manganate selected from the class consisting of $BaMnO_3$, $Ba_2MnO_4$, $CaMnO_3$, $Ca_2MnO_4$, $MgMnO_3$, $Mg_2MnO_4$, $SrMnO_3$ and $Sr_2MnO_4$, and between 1 and 10% of an additional oxide selected from the class consisting of titanium dioxide and manganese dioxide, to modify the A. C. resistivity of said material.

4. A ceramic semi-conductive material consisting essentially of the fired vitrified product of at least one manganate selected from the group consisting of $BaMnO_3$, $Ba_2MnO_4$, $CaMnO_3$, $Ca_2MnO_4$, $MgMnO_3$, $Mg_2MnO_4$, $SrMnO_3$ and $Sr_2MnO_4$, and 1 to 10% by weight of a flux selected from the class consisting of lead borate, lead oxide, lead silicate, and boric acid and between 1 and 20% by weight of an additional metal oxide selected from the class consisting of zinc oxide, magnesium oxide and cadmium oxide.

5. An electric resistance element comprising a ceramic semi-conductive body of vitrified particles, said particles including at least one substance selected from the group consisting of $BaMnO_3$, $Ba_2MnO_4$, $CaMnO_3$, $Ca_2MnO_4$, $MgMnO_3$, $Mg_2MnO_4$, $SrMnO_3$ and $Sr_2MnO_4$, having electrodes connected thereto.

6. An electric resistance element according to claim 5 wherein said substance is $BaMnO_3$.

7. An electric resistance element according to claim 5 wherein said substance is $Ba_2MnO_4$.

8. An electric resistance element according to claim 5 wherein said substance is $SrMnO_3$.

9. An electric resistance element according to claim 5 wherein said substance is $Sr_2MnO_4$.

10. An electric resistance element according to claim 5 wherein said substance is $CaMnO_3$.

11. An electric circuit element comprising a body of a ceramic semi-conductive material consisting essentially of the fired vitrified product of at least one manganate selected from the group consisting of $BaMnO_3$, $Ba_2MnO_4$, $CaMnO_3$, $Ca_2MnO_4$, $MgMnO_3$, $Mg_2MnO_4$, $SrMnO_3$, and $Sr_2MnO_4$, and 1–10% by weight of a flux selected from the class consisting of lead borate, lead oxide, lead silicate and boric acid, to reduce the firing temperature of said material, having electrodes connected thereto.

12. An electric circuit element according to claim 11 wherein said manganate is $BaMnO_3$ and said flux is lead borate.

13. An electric circuit element comprising a body of ceramic semi-conductive material consisting essentially of the fired vitrified product of at least one manganate and selected from the class consisting of $BaMnO_3$, $Ba_2MnO_4$, $CaMnO_3$, $Ca_2MnO_4$, $MgMnO_3$, $Mg_2MnO_4$, $SrMnO_3$ and $Sr_2MnO_4$, and between 1 and 20% by weight of an additional metal oxide selected from the class consisting of zinc oxide, magnesium oxide and cadmium oxide, to increase the A. C. resistivity of said material, having electrodes connected thereto.

14. An electric circuit element according to claim 13 wherein said manganate is $BaMnO_3$ and said oxide is zinc oxide.

15. An electric circuit element comprising a body of ceramic semi-conductive material consisting essentially of the fired vitrified product of at least one manganate selected from the class consisting of $BaMnO_3$, $Ba_2MnO_4$, $CaMnO_3$, $Ca_2MnO_4$, $MgMnO_3$, $Mg_2MnO_4$, $SrMnO_3$ and $Sr_2MnO_4$, and between 1 and 10% of an additional oxide selected from the class consisting of titanium dioxide and manganese dioxide, to modify the A. C. resistivity of said material, having electrodes connected thereto.

References Cited in the file of this patent

UNITED STATES PATENTS

| | | |
|---|---|---|
| 1,592,480 | Wilson | July 13, 1926 |
| 2,402,518 | Wainer | June 18, 1946 |
| 2,424,111 | Navias | July 15, 1947 |
| 2,438,761 | Martin | Mar. 30, 1948 |

FOREIGN PATENTS

| | | |
|---|---|---|
| 700,357 | France | Feb. 27, 1931 |

OTHER REFERENCES

Mellor, "Comprehensive Treatise on Inorganic and Theoretical Chemistry," vol. 12, pages 288–289.

Wright, "Preparation of Manganates and Permanganates of Alkali and Alkaline Earth Group Metals," Can. Chem. J., vol. 3, pages 361–4, 1919.

Zeitschrift für Anorganische Chemie, vol. 33, 1903, pages 328–329.